United States Patent
Yousefpor et al.

(10) Patent No.: US 9,606,663 B2
(45) Date of Patent: Mar. 28, 2017

(54) MULTIPLE STIMULATION PHASE DETERMINATION

(75) Inventors: Marduke Yousefpor, San Jose, CA (US); Steve Porter Hotelling, San Jose, CA (US)

(73) Assignee: Apple Inc., Cupertino, CA (US)

(*) Notice: Subject to any disclaimer, the term of this patent is extended or adjusted under 35 U.S.C. 154(b) by 348 days.

(21) Appl. No.: 12/208,329

(22) Filed: Sep. 10, 2008

(65) Prior Publication Data

US 2010/0060591 A1     Mar. 11, 2010

(51) Int. Cl.
    *G06F 3/041*          (2006.01)
    *G06K 9/40*           (2006.01)
    *G06F 3/044*          (2006.01)

(52) U.S. Cl.
    CPC ............ *G06F 3/0416* (2013.01); *G06F 3/044* (2013.01)

(58) Field of Classification Search
    CPC ............................... G06F 3/0416; G06F 3/044
    USPC ......................................................... 345/173
    See application file for complete search history.

(56) References Cited

U.S. PATENT DOCUMENTS

| | | |
|---|---|---|
| 3,342,935 A | 9/1967 | Leifer et al. |
| 3,732,369 A | 5/1973 | Cotter |
| 3,767,858 A | 10/1973 | Rodgers |
| 3,818,133 A | 6/1974 | Cotter |
| 3,875,472 A | 4/1975 | Schermerhorn |
| 3,886,539 A | 5/1975 | Gould, Jr. |
| 4,071,691 A | 1/1978 | Pepper, Jr. |
| 4,080,515 A | 3/1978 | Anderson |
| 4,103,252 A | 7/1978 | Bobick |
| 4,129,747 A | 12/1978 | Pepper, Jr. |
| 4,444,998 A | 4/1984 | House |
| 4,550,221 A | 10/1985 | Mabusth |
| 4,560,830 A | 12/1985 | Perl |
| 4,680,429 A | 7/1987 | Murdock et al. |
| 4,698,460 A | 10/1987 | Krein et al. |

(Continued)

FOREIGN PATENT DOCUMENTS

| | | |
|---|---|---|
| CN | 1175315 A | 3/1998 |
| CN | 1254902 A | 5/2000 |

(Continued)

OTHER PUBLICATIONS

John Fakatselis, "Processing Gain for Direct Sequence Spread Spectrum Communication System and PRISM", Aug. 1996, pp. 1-2.*

(Continued)

*Primary Examiner* — Ilana Spar
*Assistant Examiner* — Mihir K Rayan
(74) *Attorney, Agent, or Firm* — Morrison & Foerster LLP (57) ABSTRACT

Determination of phases of multiple stimulation signals to be simultaneously applied to a touch sensor panel is disclosed. A matrix may be determined that is invertible and has a gain greater than one, where each row of the matrix may represent a single step among multiple steps needed to compute values for generating an image of touch, each column of the matrix may represent a drive line of the touch sensor panel to be stimulated, and each element of the matrix may represent the phase of the stimulation signal to be applied to a particular drive line in a particular step. For each step, stimulation signals having phases in accordance with the matrix elements may be simultaneously applied to the drive lines of the touch sensor panel.

17 Claims, 5 Drawing Sheets

(56) References Cited

U.S. PATENT DOCUMENTS

| | | | |
|---|---|---|---|
| 4,733,222 A | 3/1988 | Evans | |
| 4,853,498 A | 8/1989 | Meadows et al. | |
| 4,916,308 A | 4/1990 | Meadows | |
| 4,922,061 A | 5/1990 | Meadows et al. | |
| 5,105,186 A | 4/1992 | May | |
| 5,270,711 A | 12/1993 | Knapp | |
| 5,305,017 A | 4/1994 | Gerpheide | |
| 5,355,149 A | 10/1994 | Casebolt | |
| 5,357,266 A | 10/1994 | Tagawa | |
| 5,483,261 A | 1/1996 | Yasutake | |
| 5,488,204 A | 1/1996 | Mead et al. | |
| 5,495,077 A | 2/1996 | Miller et al. | |
| 5,526,294 A * | 6/1996 | Ono | H03K 17/962 708/143 |
| 5,543,590 A | 8/1996 | Gillespie et al. | |
| 5,565,658 A | 10/1996 | Gerpheide et al. | |
| 5,606,346 A | 2/1997 | Kai | |
| 5,621,425 A | 4/1997 | Hoshino et al. | |
| 5,650,597 A | 7/1997 | Redmayne | |
| 5,650,801 A * | 7/1997 | Higashi | 345/210 |
| 5,686,705 A | 11/1997 | Conroy et al. | |
| 5,766,463 A | 6/1998 | Janik et al. | |
| 5,790,107 A | 8/1998 | Kasser et al. | |
| 5,816,225 A | 10/1998 | Koch et al. | |
| 5,825,352 A | 10/1998 | Bisset et al. | |
| 5,831,600 A | 11/1998 | Inoue et al. | |
| 5,835,079 A | 11/1998 | Shieh | |
| 5,838,308 A | 11/1998 | Knapp et al. | |
| 5,861,583 A | 1/1999 | Schediwy et al. | |
| 5,880,411 A | 3/1999 | Gillespie et al. | |
| 5,920,309 A * | 7/1999 | Bisset et al. | 345/173 |
| 5,945,980 A | 8/1999 | Moissev et al. | |
| 5,996,082 A | 11/1999 | Cortopassi | |
| 6,025,726 A | 2/2000 | Gershenfeld | |
| 6,043,810 A | 3/2000 | Kim et al. | |
| 6,057,903 A | 5/2000 | Colgan et al. | |
| 6,075,520 A * | 6/2000 | Inoue et al. | 345/173 |
| 6,177,918 B1 | 1/2001 | Colgan et al. | |
| 6,188,391 B1 | 2/2001 | Sealy et al. | |
| 6,204,897 B1 | 3/2001 | Colgan et al. | |
| 6,222,528 B1 | 4/2001 | Gerpheide | |
| 6,246,729 B1 * | 6/2001 | Richardson | H04L 27/22 329/345 |
| 6,310,610 B1 | 10/2001 | Beaton et al. | |
| 6,323,846 B1 | 11/2001 | Westerman et al. | |
| 6,327,011 B2 | 12/2001 | Kim | |
| 6,380,931 B1 | 4/2002 | Gillespie et al. | |
| 6,424,094 B1 | 7/2002 | Feldman | |
| 6,429,857 B1 | 8/2002 | Masters et al. | |
| 6,452,514 B1 | 9/2002 | Philipp | |
| 6,483,498 B1 | 11/2002 | Colgan et al. | |
| 6,492,979 B1 | 12/2002 | Kent et al. | |
| 6,501,529 B1 | 12/2002 | Kurihara et al. | |
| 6,559,658 B1 | 5/2003 | Brandt | |
| 6,583,676 B2 | 6/2003 | Krah et al. | |
| 6,621,484 B1 | 9/2003 | Yee | |
| 6,680,448 B2 | 1/2004 | Kawashima et al. | |
| 6,690,387 B2 | 2/2004 | Zimmerman et al. | |
| 6,730,863 B1 | 5/2004 | Gerpheide et al. | |
| 6,816,750 B1 | 11/2004 | Klaas | |
| 7,015,894 B2 | 3/2006 | Morohoshi | |
| 7,030,782 B2 | 4/2006 | Ely et al. | |
| 7,031,886 B1 * | 4/2006 | Hargreaves | G06F 3/044 375/350 |
| 7,042,444 B2 | 5/2006 | Cok | |
| 7,050,046 B1 | 5/2006 | Park et al. | |
| 7,129,935 B2 | 10/2006 | Mackey | |
| 7,129,939 B2 | 10/2006 | Toyozawa et al. | |
| 7,133,032 B2 | 11/2006 | Cok | |
| 7,184,064 B2 | 2/2007 | Zimmerman et al. | |
| 7,202,856 B2 | 4/2007 | Cok | |
| 7,230,608 B2 | 6/2007 | Cok | |
| 7,230,609 B2 | 6/2007 | Chao et al. | |
| 7,277,087 B2 | 10/2007 | Hill et al. | |
| 7,280,167 B2 | 10/2007 | Choi et al. | |
| 7,289,142 B2 | 10/2007 | Silverbrook | |
| 7,339,499 B2 | 3/2008 | Khlat | |
| 7,362,313 B2 | 4/2008 | Geaghan et al. | |
| 7,372,455 B2 | 5/2008 | Perski et al. | |
| 7,379,054 B2 | 5/2008 | Lee | |
| 7,436,393 B2 | 10/2008 | Hong et al. | |
| 7,643,011 B2 | 1/2010 | O'Connor et al. | |
| 7,649,524 B2 | 1/2010 | Haim et al. | |
| 7,663,607 B2 | 2/2010 | Hotelling et al. | |
| 7,812,827 B2 | 10/2010 | Hotelling et al. | |
| 7,859,522 B2 | 12/2010 | Takahashi et al. | |
| 7,986,193 B2 | 7/2011 | Krah | |
| 8,026,904 B2 | 9/2011 | Westerman | |
| 8,144,125 B2 | 3/2012 | Peng | |
| 8,144,126 B2 | 3/2012 | Wright | |
| 8,232,970 B2 | 7/2012 | Krah et al. | |
| 8,237,667 B2 | 8/2012 | Krah | |
| 8,479,122 B2 | 7/2013 | Hotelling et al. | |
| 8,493,331 B2 | 7/2013 | Krah et al. | |
| 8,514,185 B2 | 8/2013 | Hotelling | |
| 8,552,998 B2 | 10/2013 | Hotelling et al. | |
| 8,592,697 B2 | 11/2013 | Hotelling et al. | |
| 8,593,423 B2 | 11/2013 | Hotelling et al. | |
| 8,659,556 B2 | 2/2014 | Wilson | |
| 8,754,867 B2 | 6/2014 | Krah et al. | |
| 8,791,920 B2 | 7/2014 | Krah | |
| 8,928,617 B2 | 1/2015 | Hotelling et al. | |
| 8,976,124 B1 | 3/2015 | Wright | |
| 8,988,390 B1 | 3/2015 | Krah et al. | |
| 9,069,408 B2 | 6/2015 | Hotelling et al. | |
| 9,086,750 B2 | 7/2015 | Krah | |
| 9,092,086 B2 | 7/2015 | Krah et al. | |
| 9,348,451 B2 | 5/2016 | Wilson et al. | |
| 9,430,087 B2 | 8/2016 | Krah et al. | |
| 9,483,141 B2 | 11/2016 | Hotelling et al. | |
| 2002/0015024 A1 | 2/2002 | Westerman et al. | |
| 2002/0067348 A1 | 6/2002 | Masters et al. | |
| 2002/0067845 A1 | 6/2002 | Griffis | |
| 2002/0084992 A1 | 7/2002 | Agnew | |
| 2002/0136269 A1 * | 9/2002 | Kurabe | H04J 13/12 375/140 |
| 2002/0140689 A1 | 10/2002 | Huang et al. | |
| 2002/0196066 A1 | 12/2002 | Krah et al. | |
| 2003/0025676 A1 | 2/2003 | Cappendijk | |
| 2003/0048261 A1 | 3/2003 | Yamamoto et al. | |
| 2003/0063073 A1 | 4/2003 | Geaghan et al. | |
| 2003/0067447 A1 | 4/2003 | Geaghan et al. | |
| 2003/0132922 A1 * | 7/2003 | Philipp | 345/173 |
| 2003/0197691 A1 | 10/2003 | Fujiwara et al. | |
| 2004/0056845 A1 | 3/2004 | Harkcom et al. | |
| 2004/0081339 A1 | 4/2004 | Benkley, III | |
| 2004/0109097 A1 | 6/2004 | Mai | |
| 2004/0141096 A1 | 7/2004 | Mai | |
| 2004/0151235 A1 * | 8/2004 | Olson | H04B 1/7103 375/148 |
| 2004/0183833 A1 * | 9/2004 | Chua | 345/773 |
| 2004/0189587 A1 | 9/2004 | Jung et al. | |
| 2004/0227743 A1 | 11/2004 | Brown | |
| 2005/0052427 A1 | 3/2005 | Wu et al. | |
| 2005/0052582 A1 | 3/2005 | Mai | |
| 2005/0094038 A1 | 5/2005 | Choi et al. | |
| 2005/0104867 A1 | 5/2005 | Westerman et al. | |
| 2005/0146512 A1 | 7/2005 | Hill et al. | |
| 2005/0146513 A1 | 7/2005 | Hill et al. | |
| 2005/0151727 A1 | 7/2005 | Kwong | |
| 2005/0231487 A1 | 10/2005 | Ming | |
| 2005/0243023 A1 | 11/2005 | Reddy et al. | |
| 2006/0007165 A1 | 1/2006 | Yang et al. | |
| 2006/0022955 A1 | 2/2006 | Kennedy | |
| 2006/0022959 A1 | 2/2006 | Geaghan | |
| 2006/0026521 A1 | 2/2006 | Hotelling et al. | |
| 2006/0097991 A1 * | 5/2006 | Hotelling et al. | 345/173 |
| 2006/0114247 A1 | 6/2006 | Brown | |
| 2006/0114650 A1 * | 6/2006 | Wang et al. | 361/681 |
| 2006/0132462 A1 * | 6/2006 | Geaghan | 345/173 |
| 2006/0145365 A1 | 7/2006 | Halls et al. | |
| 2006/0146033 A1 | 7/2006 | Chen et al. | |
| 2006/0146034 A1 | 7/2006 | Chen et al. | |
| 2006/0161870 A1 | 7/2006 | Hotelling et al. | |

(56) References Cited

U.S. PATENT DOCUMENTS

| | | |
|---|---|---|
| 2006/0197750 A1 | 9/2006 | Kerr et al. |
| 2006/0197753 A1 | 9/2006 | Hotelling |
| 2006/0244736 A1 | 11/2006 | Tseng |
| 2006/0279548 A1 | 12/2006 | Geaghan |
| 2007/0018969 A1 | 1/2007 | Chen et al. |
| 2007/0062739 A1 | 3/2007 | Philipp et al. |
| 2007/0075977 A1 | 4/2007 | Chen et al. |
| 2007/0109274 A1* | 5/2007 | Reynolds ............... G06F 3/041 345/173 |
| 2007/0176905 A1 | 8/2007 | Shih et al. |
| 2007/0216657 A1 | 9/2007 | Konicek |
| 2007/0229468 A1 | 10/2007 | Peng et al. |
| 2007/0257890 A1 | 11/2007 | Hotelling et al. |
| 2007/0262967 A1 | 11/2007 | Rho |
| 2007/0268272 A1 | 11/2007 | Perski et al. |
| 2007/0273663 A1* | 11/2007 | Park et al. ................ 345/173 |
| 2007/0274411 A1* | 11/2007 | Lee ..................... H04B 7/0456 375/267 |
| 2008/0006453 A1 | 1/2008 | Hotelling |
| 2008/0012835 A1 | 1/2008 | Rimon et al. |
| 2008/0018618 A1 | 1/2008 | Hill et al. |
| 2008/0042964 A1* | 2/2008 | Sako .................... G09G 3/3622 345/98 |
| 2008/0048989 A1 | 2/2008 | Yoon et al. |
| 2008/0048994 A1 | 2/2008 | Lee et al. |
| 2008/0055221 A1 | 3/2008 | Yabuta et al. |
| 2008/0055268 A1 | 3/2008 | Yoo et al. |
| 2008/0062147 A1 | 3/2008 | Hotelling et al. |
| 2008/0067528 A1 | 3/2008 | Choi et al. |
| 2008/0074401 A1 | 3/2008 | Chung et al. |
| 2008/0079697 A1 | 4/2008 | Lee et al. |
| 2008/0088594 A1 | 4/2008 | Liu et al. |
| 2008/0129898 A1 | 6/2008 | Moon |
| 2008/0136980 A1 | 6/2008 | Rho et al. |
| 2008/0143683 A1 | 6/2008 | Hotelling |
| 2008/0150901 A1 | 6/2008 | Lowles et al. |
| 2008/0156546 A1 | 7/2008 | Hauck |
| 2008/0157867 A1* | 7/2008 | Krah .................... G06F 3/044 329/304 |
| 2008/0157893 A1 | 7/2008 | Krah |
| 2008/0158167 A1 | 7/2008 | Hotelling et al. |
| 2008/0158169 A1 | 7/2008 | O'Connor et al. |
| 2008/0158172 A1 | 7/2008 | Hotelling et al. |
| 2008/0158180 A1 | 7/2008 | Krah et al. |
| 2008/0158184 A1 | 7/2008 | Land et al. |
| 2008/0165203 A1 | 7/2008 | Pantfoerder |
| 2008/0278143 A1 | 11/2008 | Cox et al. |
| 2008/0309625 A1* | 12/2008 | Krah .................... G06F 3/041 345/173 |
| 2008/0309628 A1* | 12/2008 | Krah et al. .............. 345/173 |
| 2009/0009483 A1 | 1/2009 | Hotelling et al. |
| 2009/0189867 A1 | 7/2009 | Krah et al. |
| 2009/0283340 A1 | 11/2009 | Liu et al. |
| 2009/0314621 A1 | 12/2009 | Hotelling |
| 2010/0059295 A1 | 3/2010 | Hotelling et al. |
| 2010/0060589 A1 | 3/2010 | Wilson |
| 2010/0060593 A1* | 3/2010 | Krah .................... G06F 3/0416 345/173 |
| 2010/0060608 A1* | 3/2010 | Yousefpor ............. G06F 3/0418 345/174 |
| 2010/0328265 A1 | 12/2010 | Hotelling et al. |
| 2011/0084857 A1 | 4/2011 | Marino et al. |
| 2012/0019467 A1 | 1/2012 | Hotelling et al. |
| 2012/0044194 A1 | 2/2012 | Peng et al. |
| 2012/0280932 A1 | 11/2012 | Krah et al. |
| 2012/0299880 A1 | 11/2012 | Krah |
| 2014/0022203 A1 | 1/2014 | Karpin et al. |
| 2014/0043293 A1 | 2/2014 | Hotelling |
| 2014/0092063 A1 | 4/2014 | Krah |
| 2014/0168143 A1 | 6/2014 | Hotelling et al. |
| 2014/0306913 A1 | 10/2014 | Krah |
| 2014/0375612 A1 | 12/2014 | Hotelling et al. |
| 2015/0234535 A1 | 8/2015 | Hotelling et al. |
| 2016/0266718 A1 | 9/2016 | Wilson et al. |

FOREIGN PATENT DOCUMENTS

| | | |
|---|---|---|
| CN | 1773442 A | 5/2006 |
| CN | 1914585 A | 2/2007 |
| EP | 0 818 751 A1 | 1/1998 |
| EP | 1 387 242 A2 | 2/2004 |
| EP | 1 387 242 A3 | 2/2004 |
| EP | 2 453 341 A1 | 5/2012 |
| GB | 1 440 130 A | 6/1976 |
| GB | 2 451 973 A | 2/2009 |
| GB | 2 451 973 B | 2/2009 |
| JP | 2000-163031 A | 6/2000 |
| JP | 2002-342033 A | 11/2002 |
| KR | 1998-0010726 A | 4/1998 |
| WO | WO-96/18179 A1 | 6/1996 |
| WO | WO-98/02964 A1 | 1/1998 |
| WO | WO-98/07127 A1 | 2/1998 |
| WO | WO-2004/099964 A2 | 11/2004 |
| WO | WO-2004/099964 A3 | 11/2004 |
| WO | WO-2008/010917 A1 | 1/2008 |
| WO | WO-2008/085416 A1 | 7/2008 |
| WO | WO-2008/085457 A2 | 7/2008 |
| WO | WO-2008/085457 A3 | 7/2008 |
| WO | WO-2008/085719 A2 | 7/2008 |
| WO | WO-2008/157245 A2 | 12/2008 |
| WO | WO-2010/030706 A1 | 3/2010 |
| WO | WO-2010/030709 A1 | 3/2010 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action mailed Aug. 17, 2012, for U.S. Appl. No. 13/250,984, filed Sep. 30, 2011, 14 pages.

Final Office Action mailed Aug. 28, 2012, for U.S. Appl. No. 12/283,423, filed Sep. 10, 2008, nine pages.

International Search Report mailed Dec. 21, 2009, for PCT Application No. PCT/US2009/056413, filed Sep. 9, 2009, three pages.

International Search Report mailed Dec. 22, 2009, for PCT Application No. PCT/US2009/056410, filed Sep. 9, 2009, three pages.

Non-Final Office Action mailed May 20, 2011, for U.S. Appl. No. 12/283,435, filed Sep. 10, 2008, six pages.

Non-Final Office Action mailed Nov. 7, 2011, for U.S. Appl. No. 13/250,984, filed Sep. 30, 2011, nine pages.

Non-Final Office Action mailed Nov. 17, 2011, for U.S. Appl. No. 12/283,423, filed Sep. 10, 2008, nine pages.

Non-Final Office Action mailed Apr. 13, 2012, for U.S. Appl. No. 13/250,984, filed Sep. 30, 2011, 14 pages.

Non-Final Office Action mailed Oct. 5, 2012, for U.S. Appl. No. 13/568,027, filed Aug. 6, 2012, six pages.

Non-Final Office Action mailed Dec. 7, 2012, for U.S. Appl. No. 13/250,984, filed Sep. 30, 2011, 10 pages.

Non-Final Office Action mailed Apr. 23, 2013, for U.S. Appl. No. 13/568,027, filed Aug. 6, 2012, 8 pages.

Notice of Allowance mailed Apr. 5, 2012, for U.S. Appl. No. 12/283,435, filed Sep. 10, 2008, seven pages.

Notice of Allowance mailed May 23, 2013, for U.S. Appl. No. 13/250,984, filed Sep. 30, 2011, 10 pages.

Notice of Allowance mailed Aug. 23, 2013, for U.S. Appl. No. 13/250,984, filed Sep. 30, 2011, 10 pages.

Notice of Allowance mailed Aug. 29, 2013, for U.S. Appl. No. 12/283,423, filed Sep. 10, 2008, eight pages.

(56) References Cited

OTHER PUBLICATIONS

Notice of Allowance mailed Nov. 25, 2013, for U.S. Appl. No. 13/568,027, filed Aug. 6, 2012, nine pages.
Non-Final Office Action mailed May 13, 2014, for U.S. Appl. No. 14/056,841, filed Oct. 17,2013, seven pages.
Notice of Allowance mailed Mar. 11, 2014, for U.S. Appl. No. 13/568,027, filed Aug. 6, 2012, eight pages.
Notice of Allowance mailed Dec. 3, 2014, for U.S. Appl. No. 13/935,333, filed Jul. 3, 2013, nine pages.
Notice of Allowance mailed Jan. 15, 2015, for U.S. Appl. No. 14/056,841, filed Oct. 17, 2013, ten pages.
Non-Final Office Action mailed Sep. 29, 2014, for U.S. Appl. No. 14/315,162, filed Jun. 25, 2014, seven pages.
Notice of Allowance (corrected) mailed Mar. 19, 2015, for U.S. Appl. No. 14/056,841, filed Oct. 17, 2013, seven pages.
Notice of Allowance mailed May 18, 2015, for U.S. Appl. No. 14/315,162, filed Jun. 25, 2014, eight pages.
Final Office Action mailed Oct. 12, 2012, for U.S. Appl. No. 12/208,315, filed Sep. 10, 2008, 21 pages.
Final Office Action mailed Dec. 5, 2013, for U.S. Appl. No. 12/208,315, filed Sep. 10, 2008, 22 pages.
Final Office Action mailed Oct. 7, 2014, for U.S. Appl. No. 12/208,315, filed Sep. 10, 2008, 28 pages.
Final Office Action mailed Dec. 24, 2015, for U.S. Appl. No. 12/208,315, filed Sep. 10, 2008, 28 pages.
Non-Final Office Action mailed Dec. 19, 2011, for U.S. Appl. No. 12/208,315, filed Sep. 10, 2008, 21 pages.
Non-Final Office Action mailed Apr. 30, 2013, for U.S. Appl. No. 12/208,315, filed Sep. 10, 2008, 21 pages.
Non-Final Office Action mailed Mar. 14, 2014, for U.S. Appl. No. 12/208,315, filed Sep. 10, 2008, 25 pages.
Non-Final Office Action mailed May 14, 2015, for U.S. Appl. No. 12/208,315, filed Sep. 10, 2008, 25 pages.
Notice of Allowance mailed Mar. 14, 2016, for U.S. Appl. No. 12/208,315, filed Sep. 10, 2008, 12 pages.
Notice of Allowance mailed Jul. 15, 2016, for U.S. Appl. No. 14/704,885, filed May 5, 2015, seven pages.
Non-Final Office Action mailed Aug. 8, 2016, for U.S. Appl. No. 15/158,461, filed May 18, 2016, 15 pages.
Chinese Search Report mailed Nov. 24, 2011, for CN Application No. ZL2008201335089, with English Translation, nine pages.
European Search Report mailed Apr. 17, 2012, for EP Patent Application No. 11188985.3, six pages.
European Search Report mailed Oct. 4, 2016, for EP Patent Application No. 16178444.2, four pages.
Final Office Action mailed Feb. 1, 2011, for U.S. Appl. No. 11/818,345, filed Jun. 13, 2007, 20 pages.
Final Office Action mailed Sep. 1, 2011, for U.S. Appl. No. 12/874,184, filed Sep. 1, 2010, 19 pages.
Final Office Action mailed Feb. 4, 2016, for U.S. Appl. No. 14/482,979, filed Sep. 10, 2014, 12 pages.
International Search Report mailed Jun. 11, 2008, for PCT Application No. PCT/US2007/026177, filed Dec. 21, 2007, three pages.
International Search Report mailed Apr. 6, 2009, for PCT Application No. PCT/US2007/088750, filed Dec. 21, 2007, six pages.
International Search Report mailed Oct. 30, 2009, for PCT Application No. PCT/US2008/066743, filed Jun. 12, 2008, six pages.
Kanda, E. et al. (2008). "55.2: Integrated Active Matrix Capacitive Sensors for Touch Panel LTPS-TFT LCDs," *SID 08 Digest*, pp. 834-837.

Non-Final Office Action mailed Nov. 4, 2009, for U.S. Appl. No. 11/619,433, filed Jan. 3, 2007, 33 pages.
Non-Final Office Action mailed May 12, 2010, for U.S. Appl. No. 11/818,345, filed Jun. 13, 2007, 27 pages.
Non-Final Office Action mailed Jun. 8, 2010, for U.S. Appl. No. 11/650,046, filed Jan. 3, 2007, 11 pages.
Non-Final Office Action mailed Nov. 22, 2010, for U.S. Appl. No. 11/650,046, filed Jan. 3, 2007, 10 pages.
Non-Final Office Action mailed Apr. 27, 2011, for U.S. Appl. No. 12/874,184, filed Sep. 1, 2010, 18 pages.
Non-Final Office Action mailed Sep. 8, 2011, for U.S. Appl. No. 12/208,334, filed Sep. 10, 2008, 16 pages.
Non-Final Office Action mailed May 2, 2012, for U.S. Appl. No. 12/874,184, filed Sep. 1, 2010, 20 pages.
Non-Final Office Action mailed Oct. 25, 2012, for U.S. Appl. No. 12/874,184, filed Sep. 1, 2010, 23 pages.
Non-Final Office Action mailed Apr. 25, 2013, for U.S. Appl. No. 13/553,421, filed Jul. 19, 2012, 10 pages.
Non-Final Office Action mailed Aug. 23, 2013, for U.S. Appl. No. 13/916,357, filed Jun. 12, 2013, 17 pages.
Non-Final Office Action mailed Jul. 29, 2015, for U.S. Appl. No. 14/482,979, filed Sep. 10, 2014, 19 pages.
Non-Final Office Action mailed Oct. 28, 2016, for U.S. Appl. No. 15/270,950, filed Sep. 20, 2016, six pages.
Notice of Allowance mailed Jun. 7, 2010, for U.S. Appl. No. 11/619,433, filed Jan. 3, 2007, 10 pages.
Notice of Allowance mailed Mar. 28, 2012, for U.S. Appl. No. 11/650,046, filed Jan. 3, 2007, seven pages.
Notice of Allowance mailed Apr. 8, 2013. for U.S. Appl. No. 11/818,345, filed Jun. 13, 2007.
Notice of Allowance mailed Jun. 4, 2013, for U.S. Appl. No. 12/874,184, filed Sep. 1, 2010, 12 pages.
Notice of Allowance mailed Sep. 27, 2013, for U.S. Appl. No. 13/553,421, filed Jul. 19, 2012, 8 pages.
Notice of Allowance mailed Feb. 6, 2014, for U.S. Appl. No. 13/916,357, filed Jun. 12, 2013, 25 pages.
Notice of Allowance mailed Jun. 13, 2014, for U.S. Appl. No. 14/019,264, filed Sep. 5, 2013, 13 pages.
Notice of Allwance mailed Mar. 25, 2015, for U.S. Appl. No. 14/270,147, filed May 5, 2014, nine pages.
Notice of Allowance mailed May 11, 2016, for U.S. Appl. No. 14/791,145, filed Jul 2, 2015, 17 pages.
Notice of Allowance mailed Aug. 29, 2016, for U.S. Appl. No. 14/482,979, filed Sep. 10, 2014, 15 pages.
Search Report mailed Oct. 15, 2008, for GB Patent Application No. 0808783.5, filed May 15, 2008, two pages.
Search Report mailed Apr. 24, 2009, for NL Application No. 2001666, English translation, 12 pages.
Search Report mailed May 25, 2015, for ROC (Taiwan) Patent Application No. 102100040, with English translation, two pages.
Taiwanese Search Report mailed Aug. 16, 2012, for TW Patent Application No. 097100216, two pages.
Wikipedia, Online-Encyclopedia. (Jun. 11, 2007). "Signal generator," retrieved on Jan. 13, 2016, located at: http://en.wikipedia.org/w/index.php?title=signal_generator$oldid=136332745, two pages.
Wikipedia, Online-Encyclopedia. (Jun. 6, 2007). "Phase (waves)," retrieved on Jan. 18, 2016, located at: http://en.wikipedia.org/w/index.php?title=phase_(wave)$oldid=136332745, two pages.

\* cited by examiner

MULTIPLE STIMULATION PHASE DETERMINATION

FIELD OF THE INVENTION

This relates to touch sensor panels and, more particularly, to the determination of phases of multiple stimulation signals to be simultaneously applied to a touch sensor panel and to the utilization of the determined phases to stimulate the panel to enable touch or hover detection at lower stimulation voltages.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface, and a display device that can be positioned behind the panel so that the touch-sensitive surface can substantially cover the viewable area of the display device. Touch screens can allow a user to perform various functions by touching the touch sensor panel using one or more fingers, a stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a plurality of drive lines and sense lines, with sensors or pixels present where the drive and sense lines intersect each other. The drive lines can be simultaneously stimulated by low-voltage stimulation signals and touch events can be detected because the charge injected into the sense lines due to the applied stimulation signals is proportional to the amount of touch. Many sources of noise can interfere with the sense lines' outputs, making it difficult to detect the outputs and hence identify touch events. The low supply voltages for the stimulation signals can reduce both the power requirements and the sizes of the touch screens. However, the low supply voltages increase the difficulty in detecting the sense lines' outputs over the noise.

SUMMARY OF THE INVENTION

This relates to the determination and utilization of phases of multiple stimulation signals to be simultaneously applied to a touch sensor panel. In some embodiments, a matrix may be determined that is invertible and has a gain greater than one. Each row of the matrix may represent a single step among multiple steps needed to compute values for generating an image of touch. Each column of the matrix may represent a drive line of the touch sensor panel to be stimulated. Each element of the matrix may represent the phase of the stimulation signal to be applied to a particular drive line in a particular step. For each step, stimulation signals having phases according to the matrix elements may be simultaneously applied to the drive lines.

In some embodiments, a matrix may be determined that is invertible and has a gain greater than one. Each row of the matrix may represent a single step among multiple steps needed to compute values for generating an image of touch. Each column of the matrix may represent a drive line of the touch sensor panel to be stimulated. Each element of the matrix may represent the phase of the stimulation signal to be applied to a particular drive line in a particular step. The matrix elements may be adjusted until a matrix is found having a gain within a predetermined range.

DETAILED DESCRIPTION OF THE PREFERRED EMBODIMENTS

In the following description of preferred embodiments, reference is made to the accompanying drawings in which it is shown by way of illustration specific embodiments in which the invention can be practiced. It is to be understood that other embodiments can be used and structural changes can be made without departing from the scope of the embodiments of this invention.

This relates to the determination of phases of multiple stimulation signals to be simultaneously applied to drive lines of a touch sensor panel and to the utilization of the determined phases to stimulate the drive lines. The phases can be determined using a matrix that is invertible and produces a gain greater than one, where each row of the matrix can represent one of several steps needed to compute capacitances for detecting and localizing touch or hover events on the touch sensor panel, each column of the matrix can represent a drive line to be stimulated, and each element of the matrix can represent the phase of the stimulation signal to be applied to a particular drive line in a particular step. This use of a matrix can provide a more effective and efficient scheme for determining appropriate phases of stimulation signals, thereby improving touch or hover detection at lower stimulation voltages.

As used herein, "simultaneously" can encompass precisely simultaneously as well as nearly simultaneously. For example, simultaneously may encompass beginning at about the same time, ending at about the same time, and/or taking place over at least partially overlapping time periods.

Although some embodiments of this invention may be described herein in terms of mutual capacitance touch sensors, it should be understood that embodiments of this invention are not so limited, but are generally applicable to devices utilizing other types of touch and proximity sensing technologies as well, including but not limited to self capacitance sensors.

Figure 1:
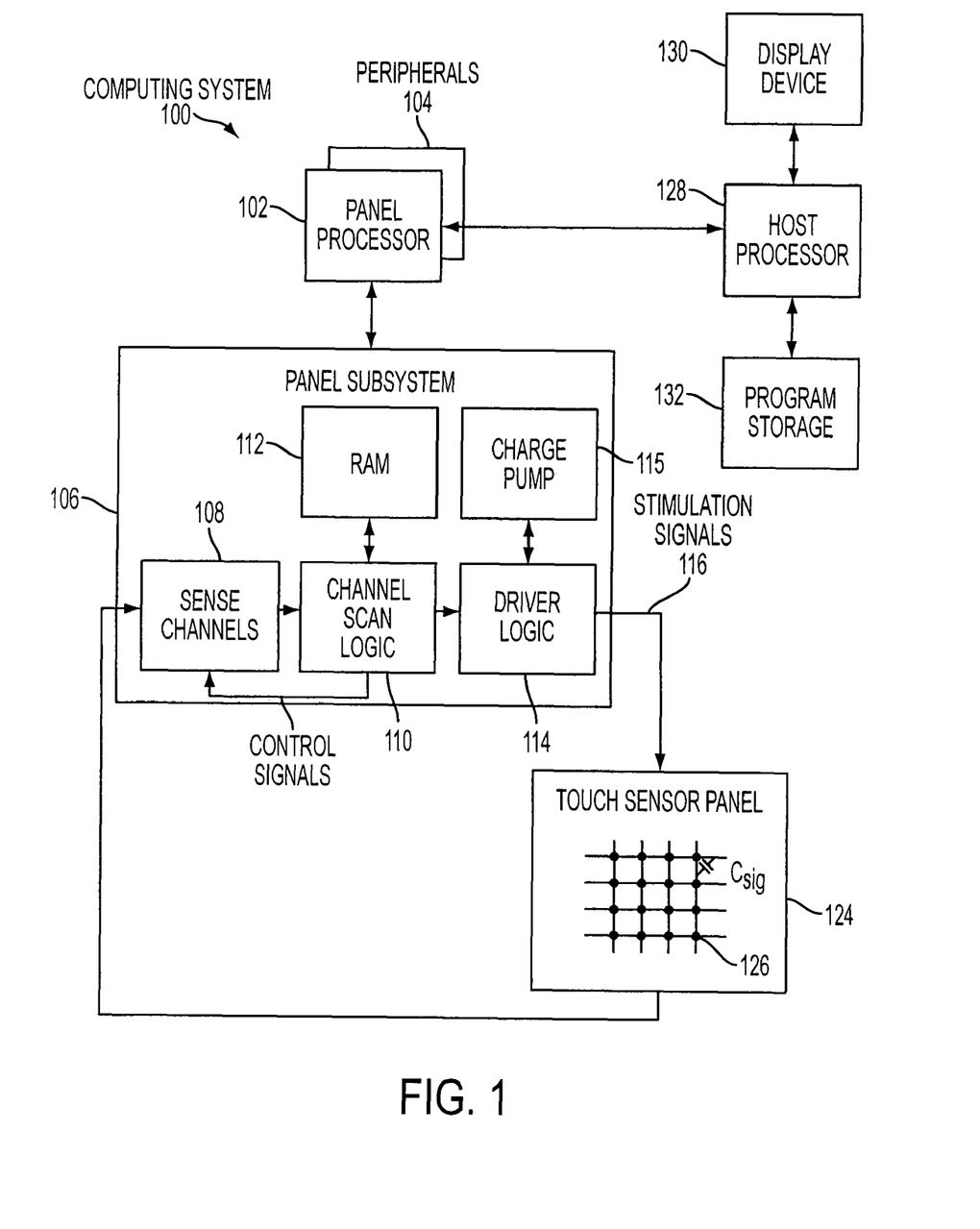
FIG. 1 illustrates an exemplary computing system according to embodiments of the invention.

FIG. 1 illustrates an exemplary computing system that can include one or more of the embodiments of the invention described herein. In the example of FIG. 1, computing system 100 can include one or more panel processors 102 and peripherals 104, and panel subsystem 106. Peripherals 104 can include, but are not limited to, random access memory (RAM) or other types of memory or storage, watchdog timers and the like. Panel subsystem 106 can include, but is not limited to, one or more sense channels 108, channel scan logic (analog or digital) 110 and driver logic (analog or digital) 114. Channel scan logic 110 can access RAM 112, autonomously read data from sense channels 108 and provide control for the sense channels. In addition, channel scan logic 110 can control driver logic 114 to generate stimulation signals 116 at various phases that can be simultaneously applied to drive lines of touch sensor panel 124 according to embodiments of the invention. Panel subsystem 106 can operate at a low digital logic voltage level (e.g. 1.7 to 3.3V). Driver logic 114 can generate a supply voltage greater that the digital logic level supply voltages by cascading two charge storage devices, e.g., capacitors, together to form charge pump 115. Charge pump 115 can be used to generate stimulation signals 116 that can have amplitudes of about twice the digital logic level supply voltages (e.g. 3.4 to 6.6V). Although FIG. 1 shows charge pump 115 separate from driver logic 114, the charge pump can be part of the driver logic. In some embodiments, panel subsystem 106, panel processor 102 and peripherals 104 can be integrated into a single application specific integrated circuit (ASIC).

Touch sensor panel 124 can include a capacitive sensing medium having a plurality of drive lines and a plurality of sense lines, although other sensing media can also be used. The drive and sense lines can be formed from a transparent conductive medium such as Indium Tin Oxide (ITO) or Antimony Tin Oxide (ATO), although other transparent and non-transparent materials such as copper can also be used. The drive and sense lines can be formed on a single side of a substantially transparent substrate, on opposite sides of the substrate, or on two separate substrates separated by the dielectric material. Each intersection of drive and sense lines can represent a capacitive sensing node and can be viewed as picture element (pixel) 126, which can be particularly useful when touch sensor panel 124 is viewed as capturing an "image" of touch. (In other words, after panel subsystem 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between the drive and sense lines and local system ground appears as a stray capacitance Cstray and the capacitance at the intersections of the drive and sense lines, i.e., the pixels, as a mutual signal capacitance Csig when the given drive line is stimulated with an alternating current (AC) signal. The presence of a finger or other object near or on the touch sensor panel can be detected by measuring changes to a signal charge present at the pixels being touched, which is a function of Csig. Each sense line of touch sensor panel 124 can drive sense channel 108 in panel subsystem 106.

Computing system 100 can also include host processor 128 for receiving outputs from panel processor 102 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device. Display device 130 together with touch sensor panel 124, when located partially or entirely under the touch sensor panel, can form a touch screen.

Note that one or more of the functions described above can be performed by firmware stored in memory (e.g. one of the peripherals 104 in FIG. 1) and executed by panel processor 102, or stored in program storage 132 and executed by host processor 128. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the sensor panel is not limited to a touch sensor panel, as described in FIG. 1, but may be a proximity sensor panel or any other sensor panel capable of sensing a touch or hover event and determining phases of stimulation signals that simultaneously drive the sensor panel according to embodiments of the invention. Furthermore, although the touch sensors in the touch sensor panel may be described herein in terms of an orthogonal array of touch sensors having rows and columns, it should be understood that embodiments of this invention are not limited to orthogonal arrays, but can be generally applicable to touch sensors arranged in any number of dimensions and orientations, including diagonal, concentric circle, and three-dimensional and random orientations. In addition, the touch sensor panel described herein can be either a single-touch or a multi-touch sensor panel.

Figure 2:
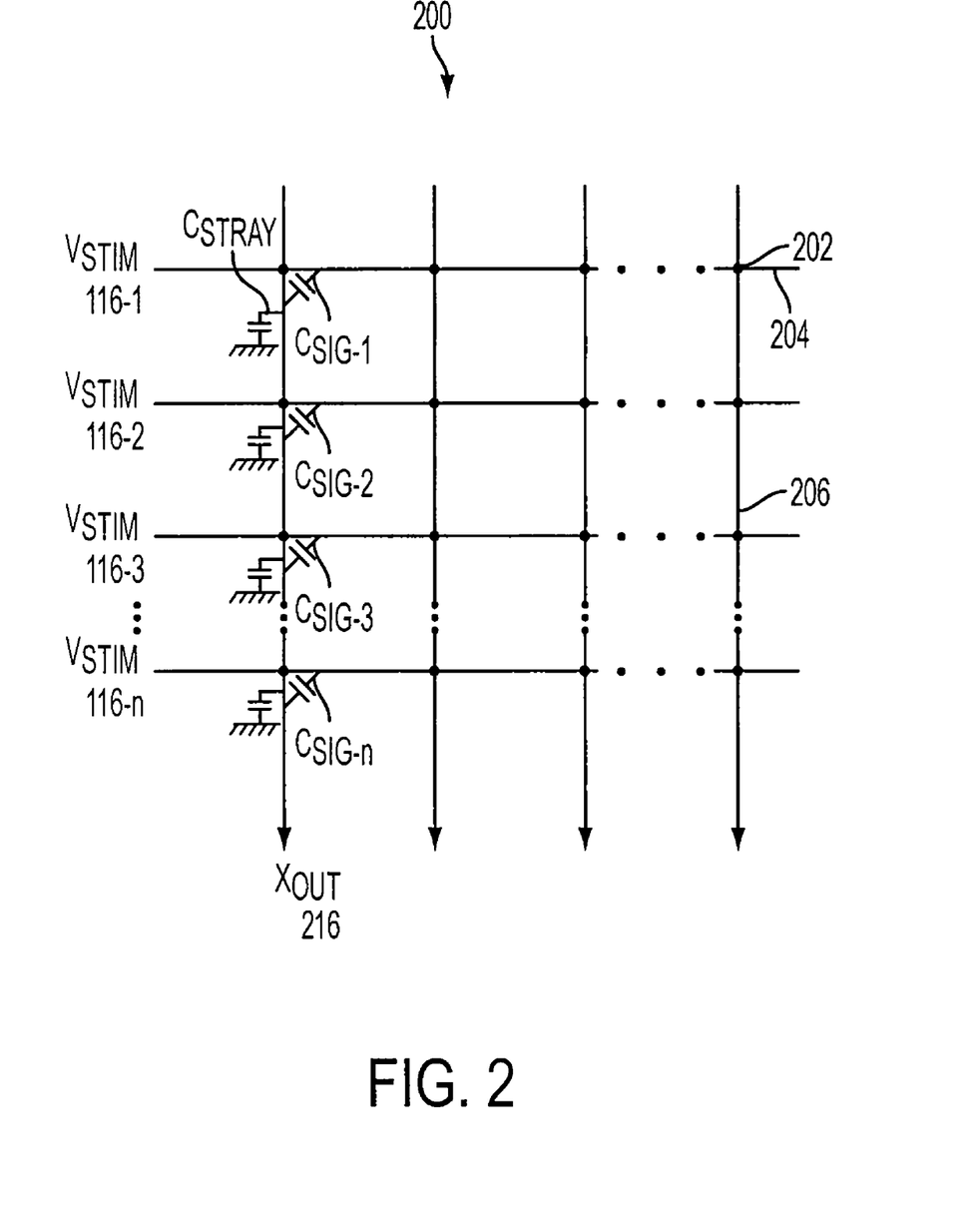
FIG. 2 illustrates an exemplary mutual capacitance touch sensor panel according to embodiments of the invention.

FIG. 2 illustrates an exemplary mutual capacitance touch sensor panel according to embodiments of the invention. In the example of FIG. 2, the panel 200 can include a plurality of drive lines 204 and a plurality of sense lines 206. An intersection of a drive line 204 and a sense line 206 can define a pixel 202. FIG. 2 indicates the presence of a stray capacitance Cstray and a mutual capacitance Csig at each pixel 202 located at the intersection of a drive line 204 and a sense line 206 (although Cstray and Csig for only one column are illustrated in FIG. 2 for purposes of simplifying the figure). Stimulation signals Vstim 116-1 through 116-n can be simultaneously applied to the n drive lines 204, where n can be any integer. Each stimulation signal Vstim 116 can be at a different phase, as will be explained later, and upon being applied to a drive line, can cause a charge Qsig=Csig*Vstim to be injected into the sense lines through the mutual capacitance Csig present at the affected pixels. A change in the injected charge can be detected when a finger, palm or other object is present at one or more of the affected pixels. The stimulation signals 116 can be sine waves or any other suitable waveform or combination of waveforms at a suitable frequency or combination of frequencies for stimulating the drive lines 204. Note that although FIG. 2 illustrates drive lines 204 and sense lines 206 as being substantially perpendicular, they need not be so aligned, as described above. As described above, each sense line 206 can be connected to a sense channel (see sense channels 108 in FIG. 1).

An example voltage of Vstim 116 can be about 4.16V. An example phase of Vstim 116 can be either 0° or 180°, which can be determined according to embodiments of the invention. A sense channel (see sense channel 108 in FIG. 1) having a charge amplifier, including feedback capacitor Cfb and feedback resistor Rfb, can receive the charge generated by the applied stimulation signal Vstim 116 and the signal capacitance Csig. The stray capacitance Cstray can be rendered ineffective at the charge amplifier using the virtual grounding provided by the feedback around the amplifier. An exemplary sense channel is disclosed in U.S. application Ser. No. 11/649,998, filed Jan. 3, 2007, the contents of which are incorporated by reference herein in their entirety for all purposes.

All or most of the drive lines 204 can be simultaneously stimulated ("multi-stim") according to embodiments of the present invention. In multi-stim, charges Qsig can be generated by Vstim 116 and Csig for all of the drive lines. The total charge output Xout 216 may be the sum of all charge injected into the sense line by each stimulated drive line. The output may be the superposition of all stimulation signals Vstim 116 multiplied by each of the Csig values on the sense line. In one example, sense line 206 can have some pixels 202 which are driven by stimulation signals 116 having a phase of 0° and simultaneously have other pixels 202 which are driven by stimulation signals 116 having a phase of 180°, although other phases are possible.

While the stimulation signals drive the drive lines, the signal capacitance for each pixel may have a certain value Csig. When a touch or hover event occurs, Csig for the affected pixels may reduce by an amount ΔCsig. This reduction may be detected in the panel output signal, thereby detecting the event. In previous panel designs, the stimulation voltage was as high as 18V. The output signal in response to the stimulation was proportional to the stimulation voltage and therefore sufficiently large to distinguish the output from any signal noise, thereby effectively detecting the touch or hover event. In panel designs according to embodiments of the invention, the stimulation voltage can be lowered, e.g., to about 4.16 V. Signal-to-noise ratio is the power of the output signal over the power of the noise, where the power of the signal is one half the amplitude of the signal squared. Hence, a drop in stimulation voltage from 18V to 4.16 V results in more than 16 times less power to generate the sense signal due to change in the capacitances Csig. This power drop could significantly lower signal resolution at the panel and make it more difficult to detect the capacitance reduction ΔCsig and hence the touch or hover event. To resolve this difficulty, a desirable phase pattern for the stimulation signals can be determined to reduce the effect of the noise at the lower stimulation voltages.

Referring again to FIG. 2, signal capacitances Csig-1 through Csig-n can be formed at the pixels 202 when stimulation signals Vstim 116-1 through 116-n are simultaneously applied to the n drive lines 204. Charges Qsig can be generated by the stimulation signals Vstim 116 and the signal capacitances Csig, and injected onto one or more sense lines 206. FIG. 2 shows the signal capacitances Csig-1 through Csig-n for only one sense line. However, the signal capacitances for the other sense lines intersecting the same drive line may be roughly the same. For example, all the sense lines that intersect the first drive line may have signal capacitance of about Csig-1 at the corresponding pixels; all the sense lines that intersect the second drive line may have signal capacitance of about Csig-2 at the corresponding pixels; and so on. Therefore, only one sense line need be considered here.

Each charge Qsig can be calculated as follows.

$$Qsig=Vstim*Csig \quad (1)$$

where Vstim is the stimulation signal applied to a drive line and Csig is the signal capacitance formed at the pixel defined by the intersection of that drive line with a sense line. The output Xout 216 is the sum of the charges Qsig generated by the stimulation signals and the signal capacitances at all the pixels on a particular sense line and can be calculated as follows.

$$Xout = \sum_{i=1}^{n} Qsig(i) \quad (2)$$

$$Xout = \sum_{i=1}^{n} Vstim(i) * Csig(i) \quad (3)$$

where i is a summation index for drive lines 1 to n. Here, the stimulation signals Vstim and the output Xout can be measured and are therefore known. The n values of Csig are not. However, the n unknown Csig values can be determined, e.g., using linear algebra concepts. In order to determine the n unknown Csig values, n equations would be needed to show the relationship between Vstim, Xout, and Csig (see, e.g., Equation (3)). These n equations could be formulated by performing a series of n steps where, during each step, a different set of stimulation signals Vstim could be simultaneously applied to the drive lines of the panel, thereby generating Csigs, and the resulting output Xout from a sense line of the panel could be measured.

Matrices can be a convenient way to represent these n equations as follows.

$$\begin{bmatrix} X1 \\ X2 \\ X3 \\ \ldots \\ Xn \end{bmatrix} = \begin{bmatrix} V11 & V12 & V13 & \ldots & V1n \\ V21 & V22 & V23 & \ldots & V2n \\ V31 & V32 & V33 & \ldots & V3n \\ \ldots & \ldots & \ldots & \ldots & \ldots \\ Vn1 & Vn2 & Vn3 & \ldots & Vnn \end{bmatrix} \times \begin{bmatrix} C1 \\ C2 \\ C3 \\ \ldots \\ Cn \end{bmatrix} \quad (4)$$

where the X matrix has elements X1 through Xn which represent Xout measured from a particular sense line in steps 1 through n; the V matrix has elements V11 through Vnn which represent Vstim applied to the drive lines in steps 1 through n, where each row represents the n stimulation signals simultaneously applied to the n drive lines during a particular step, each column represents a drive line to be stimulated, and each element represents a stimulation voltage; and the C matrix has elements C1 through Cn which represent Csig formed at the pixels defined by the intersection of drive lines 1 through n and the particular sense line.

Vstim can be written as $AoG(\omega,a,\phi,T)\delta$, where Ao can be the drive amplitude, $G(\omega,a,\phi,T)$, the signal processing gain as a function of stimulation frequency $\omega$, panel magnitude/phase response $a/\phi$, and duration of signal processing integration time T, and $\delta$, the drive phase. As such, the Vstim matrix V may become $$\begin{bmatrix} AoG(\omega, a, \phi, T)\delta 11 & AoG(\omega, a, \phi, T)\delta 12 & AoG(\omega, a, \phi, T)\delta 13 & \ldots & AoG(\omega, a, \phi, T)\delta 1n \\ AoG(\omega, a, \phi, T)\delta 21 & AoG(\omega, a, \phi, T)\delta 22 & AoG(\omega, a, \phi, T)\delta 23 & \ldots & AoG(\omega, a, \phi, T)\delta 2n \\ AoG(\omega, a, \phi, T)\delta 31 & AoG(\omega, a, \phi, T)\delta 32 & AoG(\omega, a, \phi, T)\delta 33 & \ldots & AoG(\omega, a, \phi, T)\delta 3n \\ \ldots & \ldots & \ldots & \ldots & \ldots \\ AoG(\omega, a, \phi, T)\delta n1 & AoG(\omega, a, \phi, T)\delta n2 & AoG(\omega, a, \phi, T)\delta n3 & \ldots & AoG(\omega, a, \phi, T)\delta nn \end{bmatrix} \quad (5)$$

In some embodiments, $AoG(\omega,a,\phi,T)$ may be constant. As such, the Vstim matrix V may become $$AoG(\omega, a, \varphi, T) \cdot \begin{bmatrix} \delta 11 & \delta 12 & \delta 13 & \ldots & \delta 1n \\ \delta 21 & \delta 22 & \delta 23 & \ldots & \delta 2n \\ \delta 31 & \delta 32 & \delta 33 & \ldots & \delta 3n \\ \ldots & \ldots & \ldots & \ldots & \ldots \\ \delta n1 & \delta n2 & \delta n3 & \ldots & \delta nn \end{bmatrix}, \quad (6)$$

where the phase may vary for each of the steps 1 through n.

It is to be understood that the amplitude, waveform, and/or frequency of the stimulation signals may also vary in some embodiments.

In matrix notation, the matrices in Equation (4) may become $$X = VC. \quad (7)$$

Ideally, Equation (7) models the behavior of a touch sensor panel. However, since noise is ever present, the following equation is more realistic.

$$X + \Delta X = VC_m, \quad (8)$$

where $\Delta X$ may be the noise and Cm may be the noise-altered signal capacitance Csig. Written another way, $$C_m = V^{-1}X + V^{-1}\Delta X, \quad (9)$$

$$C_m = V^{-1}(VC) + V^{-1}\Delta X, \quad (10)$$

$$C_m = C + V^{-1}\Delta X, \quad (11)$$

where $V^{-1}$ may be the inverse matrix of V. C may be the ideal signal capacitance Csig and $V^{-1}\Delta X$ may be the disturbance due to noise.

As stated above, noise may make the detection of an output signal difficult. However, the effect of the noise may be reduced by making the noise term $V^{-1}\Delta X$ in Equation (11) smaller. To do so, a stimulation signal matrix V can be found that can make its inverse matrix $V^{-1}$ have as small a gain as possible in all vector space of noise vector $\Delta X$, thereby reducing the effect of the noise in the panel. Equation (6) shows an exemplary matrix V in which the stimulation signal voltage amplitude, frequency, and waveform are constant and the phase is variable. In which case, only a phase matrix P of the stimulation signal Vstim need be determined that can reduce the effect of the noise. An exemplary phase matrix P may be $$\begin{bmatrix} \delta 11 & \delta 12 & \delta 13 & \ldots & \delta 1n \\ \delta 21 & \delta 22 & \delta 23 & \ldots & \delta 2n \\ \delta 31 & \delta 32 & \delta 33 & \ldots & \delta 3n \\ \ldots & \ldots & \ldots & \ldots & \ldots \\ \delta n1 & \delta n2 & \delta n3 & \ldots & \delta nn \end{bmatrix}. \quad (12)$$

The phase matrix P may be decomposed using singular value decomposition (SVD) to take the form $$P = U\Sigma Y^T \quad (13)$$

where U may be a unitary n×n matrix that contains a set of output singular vectors of the phase matrix P, Y may be another unitary n×n matrix that contains a set of input singular vectors of the phase matrix P, and $\Sigma$ may be a diagonal n×n matrix that contains the singular values of the phase matrix P. The diagonal matrix $\Sigma$ may be $$\begin{bmatrix} s11 & 0 & 0 & \ldots & 0 \\ 0 & s22 & 0 & \ldots & 0 \\ 0 & 0 & s33 & \ldots & 0 \\ \ldots & \ldots & \ldots & \ldots & \ldots \\ 0 & 0 & 0 & \ldots & snn \end{bmatrix} \quad (14)$$

where the values along the diagonal s11, s22, ..., snn may be the singular values.

Conversely, the inverse of the phase matrix $P^{-1}$ may take the form $$P^{-1} = Y\Sigma^{-1}U^T. \quad (15)$$

The U, $\Sigma$, and Y matrices may be used in determining the phases of stimulation signals according to embodiments of the invention.

In one embodiment, the phase matrix P may be a circulant matrix. A circulant matrix is a special kind of Toeplitz matrix where each row of the matrix is shifted one element to the right relative to the preceding row. An exemplary circulant matrix may be $$\begin{bmatrix} a & b & c & d \\ d & a & b & c \\ c & d & a & b \\ b & c & d & a \end{bmatrix} \quad (16)$$

which, for a phase matrix, may be $$\begin{bmatrix} \delta 1 & \delta 2 & \delta 3 & \delta 4 \\ \delta 4 & \delta 1 & \delta 2 & \delta 3 \\ \delta 3 & \delta 4 & \delta 1 & \delta 2 \\ \delta 2 & \delta 3 & \delta 4 & \delta 1 \end{bmatrix}. \quad (17)$$

A phase pattern represented by $\delta 1$ through $\delta n$ may be shifted to the right in each subsequent row of a circulant matrix. Each row of the matrix may represent a step taken, as described above, in which n stimulation signals may be simultaneously applied to n drive lines to generate an output, where Equation (3), which shows the relationship between the stimulation signals Vstim, the output Xout, and the signal capacitance Csig, may form the n equations to be used to compute the signal capacitances Csig. In this example, n=4. Though the exemplary circulant matrix is shown as a square matrix, it need not always be so. Rather, the circulant matrix may have more rows than columns.

The circulant phase matrix may have the following characteristics. The matrix may be invertible, as illustrated in Equation (11). The matrix gain, which can be the singular value of the matrix, may be greater than one so as to maintain noise rejection comparable to that in the previous higher stimulation voltage design. In some embodiments, the matrix gain may be in a range between about three and about six. Also, the phase of a stimulation signal may be positive or negative, e.g., 0° or 180° respectively. As such, the phase may be represented in the phase matrix as +1 and −1 respectively. Additionally, the imbalance between the positive and negative phases in the rows of the matrix may be no greater than 50%. This means that, for each row, the number of +1s can be no greater than twice the number of −1s and vice versa. The imbalance requirement may be directly related to the dynamic range requirement of the sensing amplifier. For example, a large imbalance may lead to a large amplifier dynamic range, which can translate into higher power consumption and ASIC chip cost.

In another embodiment, the phase matrix P may be a Hadamard matrix. A Hadamard matrix is a square matrix of order $2^k$, where k is an integer, and whose elements have values of either +1 or −1 and whose rows are mutually orthogonal. Exemplary Hadamard matrices H may be as follows.

$$H1 = [1] \quad (18)$$

$$H2 = \begin{bmatrix} H1 & -H1 \\ -H1 & -H1 \end{bmatrix} \quad (19)$$

$$H2^k = \begin{bmatrix} H2^{k-1} & -H2^{k-1} \\ -H2^{k-1} & -H2^{k-1} \end{bmatrix}. \quad (20)$$

For k=2, the Hadamard matrix may be $$H4 = \begin{bmatrix} +1 & -1 & -1 & +1 \\ -1 & -1 & +1 & +1 \\ -1 & +1 & -1 & +1 \\ +1 & +1 & +1 & +1 \end{bmatrix} \quad (21)$$

which, for a phase matrix, may be $$\begin{bmatrix} \delta 11 & \delta 12 & \delta 13 & \delta 14 \\ \delta 21 & \delta 22 & \delta 23 & \delta 24 \\ \delta 31 & \delta 32 & \delta 33 & \delta 34 \\ \delta 41 & \delta 42 & \delta 43 & \delta 44 \end{bmatrix}. \quad (22)$$

Each row of the matrix may represent a step taken, as described above, in which n stimulation signals may be simultaneously applied to n drive lines to generate an output, where Equation (3), which shows the relationship between the stimulation signals Vstim, the output Xout, and the signal capacitance Csig, may form the n equations to be used to compute the signal capacitances Csig. In this example, n=4.

The Hadamard phase matrix may have the following characteristics. The matrix may be invertible, as illustrated in Equation (11). The matrix gain may be greater than one so as to maintain noise rejection comparable to that in the previous higher supply voltage design. In some embodiments, the matrix gain may be in a range between about three and about six. Also, the phase of a stimulation signal may be positive or negative, e.g., 0° or 180° respectively. As such, the phase may be represented in the phase matrix as +1 and −1 respectively, which is a characteristic of a Hadamard matrix. A characteristic of the Hadamard matrix is that the imbalance between the positive and negative phases in the rows of the matrix may be greater than 50%. Accordingly, additional circuitry and signal processing may be required to reduce the effects of a large imbalance.

It is to be understood that the phase matrix is not limited to a circulant or Hadamard matrix, but may be any matrix capable of being utilized for determining phases of stimulation signals to be simultaneously applied to drive lines of a touch sensor panel in accordance with embodiments of the invention.

Figure 3:
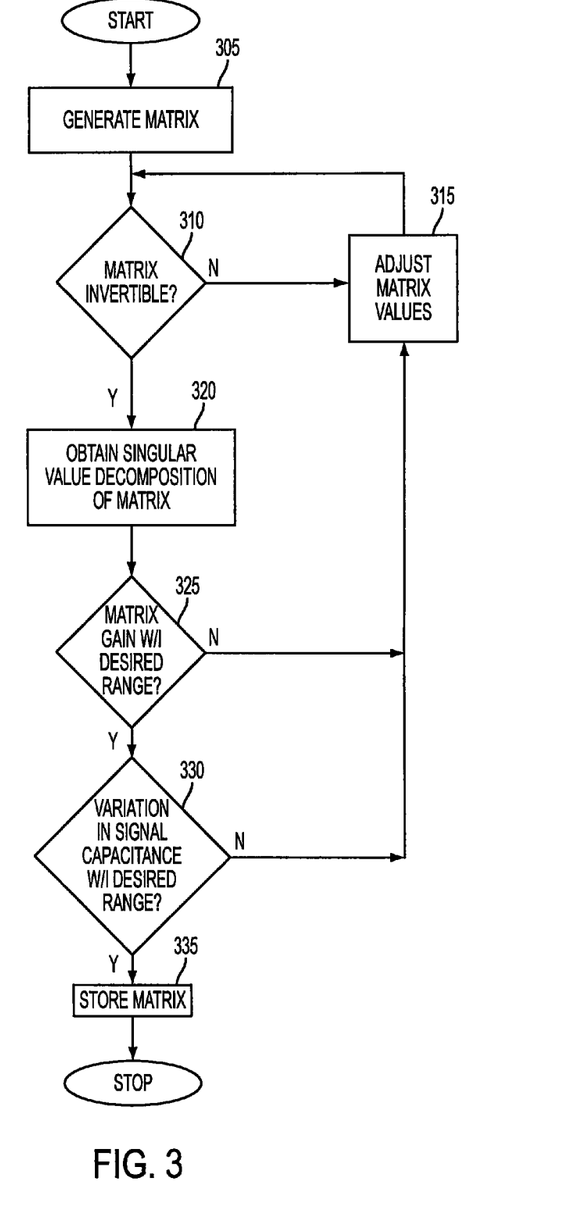
FIG. 3 illustrates an exemplary method for determining phases of stimulation signals to be simultaneously applied to drive lines of a touch sensor panel according to embodiments of the invention.

FIG. 3 illustrates an exemplary method for determining phases of stimulation signals to be simultaneously applied to drive lines of a touch sensor panel according to embodiments of the invention. Initially, a processor may generate a stimulation matrix having at least n rows and n columns of elements, where n may be the number of drive lines in the panel (305). Each row of the matrix may represent one of several steps needed in order to compute capacitances of the panel for later use in touch or hover detection, as discussed previously. Each column of the matrix may represent a drive line to be stimulated. Each element of the matrix may represent the phase of the stimulation signal to be applied to a particular drive line in a particular step. Example elements of the matrix may have values of −1 for a negative phase, e.g., a phase of 180°, and +1 for a positive phase, e.g., a phase of 0°.

The processor may determine whether the generated matrix is invertible (310). If the matrix is not invertible, the processor may adjust the matrix's element values (315). The matrix's element values may be adjusted by changing one or more of the values to its opposite value, e.g., by changing a −1 to a +1 and vice versa. The method may repeat at adjusted element values until the matrix is invertible (310, 315).

If the matrix is invertible, the processor may obtain a singular value decomposition of the matrix (320). To do so, the processor may generate two unitary matrices and a diagonal matrix of the stimulation matrix, as illustrated in Equations (13)-(15). From the diagonal matrix, the processor may determine the matrix gain based on the singular values of the diagonal matrix. For example, the matrix gain may be the minimum singular value in the diagonal matrix. Alternatively, any technique suitable for determining the matrix gain may be used.

The processor may determine whether the gain is within a desired range (325). For example, the gain may be in a desired range if the gain is greater than one and/or between three and six. If not, the processor may adjust the matrix's element values (315). The method may repeat at adjusted element values until the gain is within the desired range (310-325).

If the gain is within the desired range, the processor may determine whether the variation of the signal capacitance Csig in the pixels due to noise is within a desired range (330). For example, the variation may be in a desired range if the variation is about 0.3 or less. The variation may be determined as follows. For each column of the Y unitary matrix, the difference between the maximum and minimum values in that column may be calculated. The maximum difference for the matrix may be determined from among these calculated column differences. This maximum difference may represent the variation of the signal capacitance Csig in the pixels due to noise. If the variation is not within the desired range, the processor may adjust the matrix's element values (315). The method may repeat at adjusted element values until the variations are within the desired range (310-330).

If the variation is within the desired range, the processor may store the generated stimulation matrix for later use to compute capacitances that may be used to detect touch or hover events (335).

In an alternate embodiment, the processor may determine whether each row of the matrix has an imbalance of no more than 50% for its −1 to +1 values. This means that the number of either +1s or −1s in a row cannot exceed the other by more than 50%. If so, the matrix's element values may be adjusted to drop below a 50% imbalance.

This method may be performed in a computer simulation.

Figure 4:
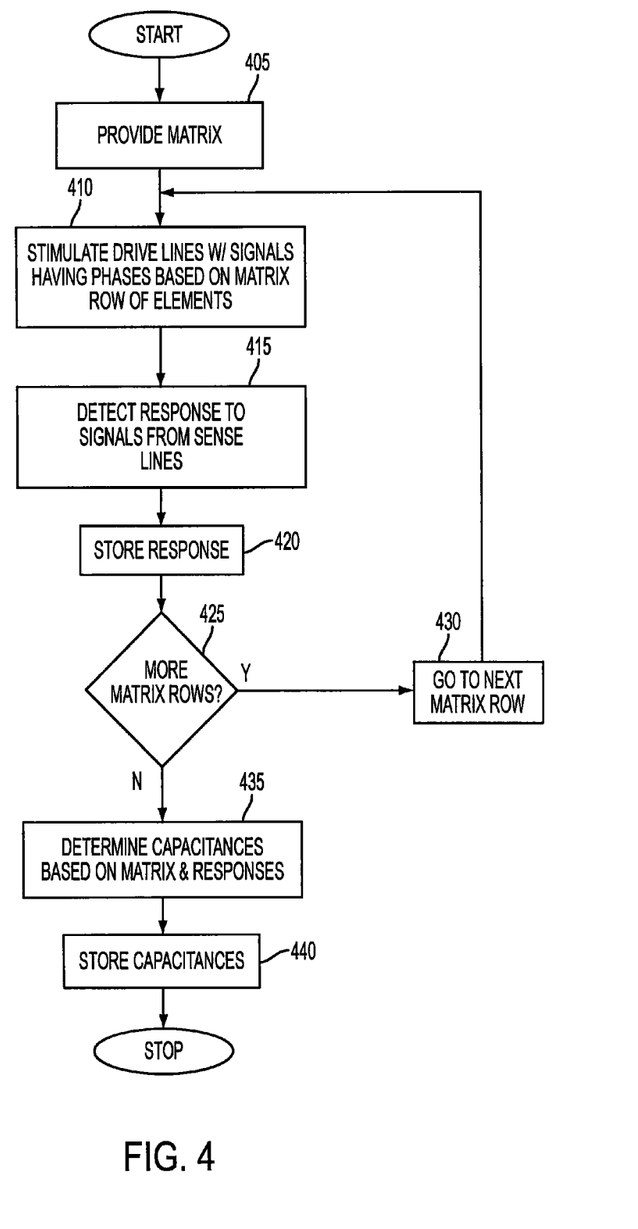
FIG. 4 illustrates another exemplary method for determining phases of stimulation signals to be simultaneously applied to drive lines of a touch sensor panel according to embodiments of the invention.

FIG. 4 illustrates another exemplary method for determining phases of stimulation signals to be simultaneously applied to drive lines of a touch sensor panel according to embodiments of the invention. Initially, a device having a touch sensor panel may access a stimulation matrix (405). The matrix may be accessed from the memory of that device or another device. Each row of the matrix may represent one of several steps needed in order to compute capacitances of the panel for use in touch or hover detection, as discussed previously. Each column of the matrix may represent a drive line to be stimulated. Each element of the matrix may represent the phase of the stimulation signal to be applied to a particular drive line in a particular step. Example elements may have values of −1 for a negative phase, e.g., a phase of 180, and +1 for a positive phase, e.g., a phase of 0.

The device may simultaneously apply stimulation signals Vstim to the drive lines of the touch sensor panel based on a row of the matrix (410). To apply the stimulation signals, the device may form the first set of stimulation signals having a voltage amplitude, waveform, frequency, and phase. In some embodiments, the amplitude may be 4.16V and the waveform may be sinusoidal with a particular frequency. The phases of the first set of stimulation signals may be determined from the elements in the first row of the matrix. For example, the stimulation signal to stimulate the first drive line may have a phase represented by the first element in the first row of the matrix. Similarly, the stimulation signal to stimulate the second drive line may have a phase represented by the second element of the first row of the matrix. And so on for the remaining first set of stimulation signals. These stimulation signals may be applied simultaneously to the drive lines.

The device can detect a response from one or more of the sense lines of the touch sensor panel to the applied stimulation signals (415). The detected response may be temporarily stored until all of the steps have been completed (420). The device may determine whether there are more matrix rows to process (425). If so, the device may consider the next row of the matrix (430) and repeat the applying (410), the detecting (415), and the storing (420) at the phases of the set of stimulation signals based on that next row of the matrix.

After all the rows have been processed, the device may determine the signal capacitances Csig formed at the sense lines by solving the matrix Equation (4), stated above (435). The determined capacitances Csig may be used as baseline values for generating an image of touch, where a reduction in the capacitance ΔCsig may be detected to indicate a touch or hover event. The determined capacitances Csig may be stored for subsequent operations of the touch sensor panel (440).

Figure 5A:
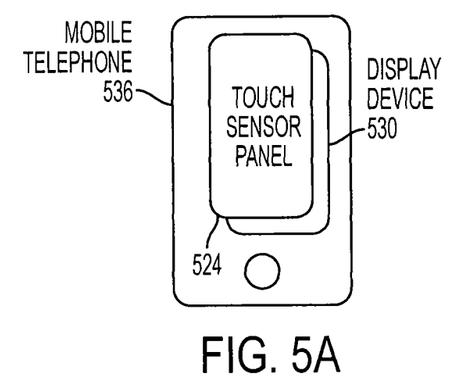
FIG. 5a illustrates an exemplary mobile telephone according to embodiments of the invention.

FIG. 5a illustrates an exemplary mobile telephone 536 that can include touch sensor panel 524, display device 530, and other computing system blocks in computing system 100 of FIG. 1 that can be utilized for determining phases of multiple stimulation signals to be simultaneously applied to drive lines of the touch sensor panel 524.

Figure 5B:
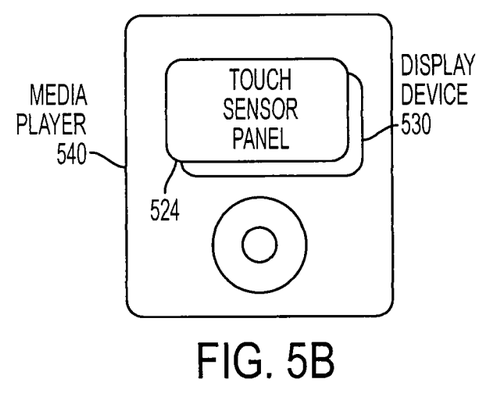
FIG. 5b illustrates an exemplary digital media player according to embodiments of the invention.

FIG. 5b illustrates an exemplary digital media player 540 that can include touch sensor panel 524, display device 530, and other computing system blocks in computing system 100 of FIG. 1 that can be utilized for determining phases of multiple stimulation signals to be simultaneously applied to drive lines of the touch sensor panel 524.

Figure 5C:
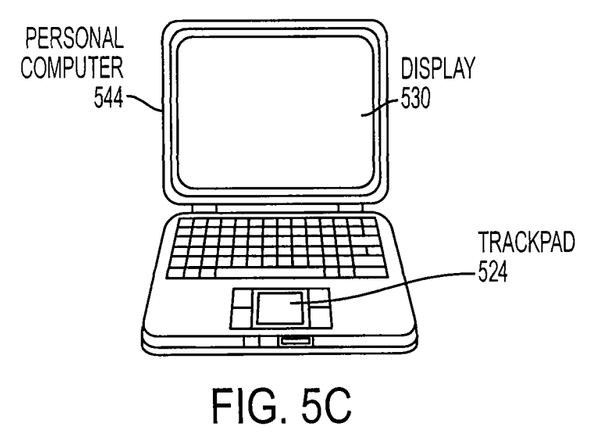
FIG. 5c illustrates an exemplary computer according to embodiments of the invention.

FIG. 5c illustrates an exemplary personal computer 544 that can include touch sensor panel (trackpad) 524 and display 530, and other computing system blocks in computing system 100 of FIG. 1 that can be utilized for determining phases of multiple stimulation signals to be simultaneously applied to drive lines of the touch sensor panel 524.

The mobile telephone, media player, and personal computer of FIGS. 5a, 5b and 5c can provide improved signal detection at lower stimulation voltages by determining appropriate phases of stimulation signals that simultaneously drive touch sensor panels according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for determining phases of stimulation signals to be simultaneously applied to a plurality of drive lines of a two-dimensional touch sensor panel, the plurality of drive lines including a first plurality of drive lines, the two-dimensional touch sensor panel comprising a plurality of sensors, each sensor formed from capacitive coupling between one of the plurality of drive lines and one of a plurality of sense lines, to generate a two-dimensional image of touch, comprising:
  accessing a memory, the memory storing instructions that contain a plurality of steps to compute values for generating signals to stimulate the first plurality of drive lines, each step of the instructions having a plurality of parameters, each parameter representing a phase of the stimulation signal to be applied to a particular drive line in a particular step, wherein the plurality of steps includes a first and second step;
  simultaneously stimulating the first plurality of drive lines with the stimulation signals, the stimulation signals having phases in accordance with the plurality of parameters in the first step;
  determining a first sense line value for each sense line of the plurality of sense line, wherein the first sense line values are based on the stimulation signals having phases in accordance with the plurality of parameters corresponding to the first step;
  maintaining the stimulation of the first plurality of drive lines with the stimulation signals, wherein the phase of the stimulation signals are set in accordance with the plurality of parameters corresponding to the second step;
  determining a second sense line value for each sense line of the plurality of sense lines, wherein the second sense line values are based on the stimulation signals having phases in accordance with the plurality of parameters in the second step; and
  generating a value corresponding to a capacitance at each sensor of the two-dimensional touch sensor panel to generate the two-dimensional image of touch from response signals received from the plurality of sense lines of the two-dimensional touch sensor panel during the plurality of steps in response to the stimulation signals, each sensor of the two-dimensional touch sensor panel measuring the capacitance between a drive line and a sense line, wherein the generated values are based on the first and second sense line values of each sense line.

2. The method of claim 1, wherein each element of the matrix has a value that is selected from a group consisting of −1 to represent a negative phase and +1 to represent a positive phase.

3. The method of claim 2, wherein those elements of the matrix that are representative of a single step to compute the values for generating the signals to stimulate the drive lines have an imbalance of no more than 50% of values of −1 to values of +1.

4. The method of claim 1, wherein the instructions provide at least as many steps as there are values to compute for generating the signals to stimulate the plurality of drive lines.

5. The method of claim 1,
  the stimulation signals, the stimulation signals being formed of a predetermined amplitude and a predetermined waveform.

6. The method of claim 1, further comprising:
  forming the stimulation signals, including
    for each stimulation signal, generating a voltage having a predetermined amplitude, a predetermined waveform, and one of the provided phases.

7. The method of claim 6, wherein the predetermined amplitude is about 4.16V.

8. The method of claim 6, wherein the predetermined waveform is sinusoidal at a predetermined frequency.

9. The method of claim 6, wherein each provided phase is either 0° or 180°.

10. The method of claim 1, wherein stimulating the drive lines comprises:
  simultaneously stimulating the drive lines with stimulation signals having phases in accordance with the elements of the row of the matrix represented by that step, and
  detecting a response from sense lines of the touch sensor panel to the stimulating of the drive lines.

11. In a system including a two-dimensional sensor panel having a plurality of drive lines, the plurality of drive lines including a first plurality of drive lines, being simultaneously driven with a plurality of stimulation signals having positive and negative phases in a particular distribution and a plurality of sense lines responding to the simultaneously driven stimulation signals, a method for determining the phases of the stimulation signals to be simultaneously applied to drive lines of a two-dimensional touch sensor panel, the method comprising:
  accessing a memory, the memory storing instructions that contain a plurality of steps to compute values for generating signals to stimulate the first plurality of drive lines, each step of the instructions having a plurality of parameters, each parameter representing a phase of the stimulation signal to be applied to a particular drive line in a particular step, wherein the plurality of steps includes a first and second step;
  for each step in the plurality of steps,
    simultaneously stimulating the first plurality of drive lines with the stimulation signals, the stimulation signals having phases in accordance with the plurality of parameters in the first step;
  determining a first sense line value for each sense line of the plurality of sense line, wherein the first sense line values are based on the stimulation signals having phases in accordance with the plurality of parameters corresponding to the first step;
  maintaining the stimulation of the first plurality of drive lines with the stimulation signals, wherein the phase of the stimulation signals are set in accordance with the plurality of parameters corresponding to the second step;
  determining a second sense line value for each sense line of the plurality of sense lines, wherein the second sense line vales are based on the stimulation signals having phases in accordance with the plurality of parameters in the second step; and
  generating a value corresponding to a capacitance at each sensor of the two-dimensional sensor panel, each sensor measuring the capacitance formed between one of the plurality of first drive lines and one of the plurality of sense lines, to generate a two-dimensional image of touch from the response detected from the sense lines of the two-dimensional sensor panel for each step of the plurality of steps, wherein the generated values are based on the first and second sense line values of each sense line.

12. The method of claim 11, further comprising:
  computing the values for generating the image of touch based on the elements of the matrix and the detected responses.

13. The method of claim 12, wherein the computed values are capacitances formed between intersections of the drive lines and the sense lines.

14. The method of claim 13, further comprising:
storing the capacitances for use in generating the image of touch.

15. A sensing device, comprising:
a two-dimensional sensor panel comprising a plurality of sensors, each sensor formed from capacitive coupling between one of a plurality of drive lines, the plurality of drive lines including a first plurality of drive lines, and one of a plurality of sense lines; and
an integrated circuit coupled to the two-dimensional sensor panel, including
driver logic configured to generate a plurality of stimulation signals to simultaneous stimulate the first plurality of drive lines, the stimulation signals having phases in accordance instructions stored in a memory, the instructions arranged to represent a plurality of parameters, each parameter, each parameter representing the phase of the stimulation signal to be applied to a particular drive line in a particular step, wherein the plurality of steps includes a first and second step;
a plurality of sense channels configured to receive a plurality of responses from the plurality of sense lines to the applied stimulation signals;
wherein the integrated circuit is capable of:
accessing a memory, the memory storing instructions that contain a plurality of steps to compute values for generating signals to stimulate the first plurality of drive lines, each step of the instructions having a plurality of parameters, each parameter representing a phase of the stimulation signal to be applied to a particular drive line in a particular step, wherein the plurality of steps includes a first and second step;
simultaneously stimulating the first plurality of drive lines with the stimulation signals, the stimulation signals having phases in accordance with the plurality of parameters in the first step;
determining a first sense line value for each sense line of the plurality of sense line, wherein the first sense line values are based on the stimulation signals having phases in accordance with the plurality of parameters corresponding to the first step;
maintaining the stimulation of the first plurality of drive lines with the stimulation signals, wherein the phase of the stimulation signals are set in accordance with the plurality of parameters corresponding to the second step;
determining a second sense line value for each sense line of the plurality of sense lines, wherein the second sense line values are based on the stimulation signals having phases in accordance with the plurality of parameters in the second step;
generating a value corresponding to a capacitance at each sensor of the two-dimensional touch sensor panel to generate the two-dimensional image of touch from response signals received from the plurality of sense lines of the two-dimensional touch sensor panel during the plurality of steps in response to the stimulation signals, each sensor of the two-dimensional touch sensor panel measuring the capacitance between a drive line and a sense line, wherein the generated values are based on the first and second sense line values of each sense line.

16. The device of claim 15 incorporated within a computing system.

17. The device of claim 15, the sensor panel being a capacitive sensor panel.

* * * * *

UNITED STATES PATENT AND TRADEMARK OFFICE
CERTIFICATE OF CORRECTION

PATENT NO. : 9,606,663 B2
APPLICATION NO. : 12/208329
DATED : March 28, 2017
INVENTOR(S) : Marduke Yousefpor et al.

It is certified that error appears in the above-identified patent and that said Letters Patent is hereby corrected as shown below:

In the Claims

At Column 13, Claim 2, Line number 44, please delete "element of the matrix" and replace with -- parameter of the plurality of parameters --.

At Column 13, Claim 3, Line number 48-49, please delete "elements of the matrix" and replace with -- plurality of parameters --.

At Column 14, Claim 10, Line number 7-10, please delete "simultaneously stimulating the drive lines with stimulation signals having phases in accordance with the elements of the row of the matrix represented by that step, and".

At Column 14, Claim 12, Line number 63, please delete "elements of the matrix" and replace with -- plurality of parameters of a given step --.

Signed and Sealed this
Fifth Day of September, 2017

Joseph Matal
*Performing the Functions and Duties of the
Under Secretary of Commerce for Intellectual Property and
Director of the United States Patent and Trademark Office*